United States Patent

Tsukuda et al.

[15] 3,688,164

[45] Aug. 29, 1972

[54] MULTI-LAYER-TYPE SWITCH DEVICE

[72] Inventors: Kiyoshi Tsukuda; Tatsya Kamei; Takuzo Ogawa, all of Hitachi, Japan

[73] Assignee: Hitachi, Ltd., Tokyo, Japan

[22] Filed: Sept. 25, 1970

[21] Appl. No.: 75,413

[30] Foreign Application Priority Data

Oct. 1, 1969 Japan ......................44/77760

[52] U.S. Cl. ....................................317/235, 29/576

[51] Int. Cl. ..............................................H01l 9/12

[58] Field of Search ..............................317/234, 235

[56] References Cited

UNITED STATES PATENTS 3,152,928 10/1964 Hubner..................317/235 X 3,239,728 3/1966 Aldrich et al.............317/235

3,300,694 1/1967 Stehney et al. ............317/235

3,408,545 10/1968 DeCecco et al. ..........317/235

3,409,810 11/1968 Matzen, Jr.................317/235

3,486,088 12/1969 Gray et al..................317/235

*Primary Examiner*—James D. Kallam

*Attorney*—Craig, Antonelli and Hill

[57] ABSTRACT

A pnpn- or npnpn-type semiconductor device having a shorted emitter structure includes at least one n-type emitter region which is further divided into a region of high injection efficiency and a region of low injection efficiency. The regions of high and low injection efficiency have a larger and smaller thickness, respectively.

13 Claims, 16 Drawing Figures

INVENTORS
KIYOSHI TSUKUDA
TATSYA KAMEI
TAKUZO OGAWA

BY Craig, Antonelli, Stewart + Hill
ATTORNEYS

INVENTORS
KIYOSHI TSUKUDA
TATSYA KAMEI
TAKUZO OGAWA

BY Craig, Antonelli, Stewart & Hill
ATTORNEYS

MULTI-LAYER-TYPE SWITCH DEVICE

This invention relates, in general, to a semiconductor device and a method for making the same.

A multi-layer-type semiconductor device such as a four-layer three-electrode thyristor comprises a semiconductor substrate having a pair of mutually opposed principal surfaces and including four contiguous layers with alternately changing conductivity types between said principal surfaces so as to form a pn-junction between each pair of adjacent layers, an anode and a cathode electrode connected to the respective outer layers by low resistance ohmic contact, and a gate electrode ohmically contacted to an intermediate layer.

Such a thyristor is switched on from the blocking state to the conducting state by allowing a gate current to flow from the gate electrode to the cathode electrode with the anode electrode applied with a positive potential relative to the cathode potential. This action is called turning-on of a thyristor.

Generally, a pnpn-type semiconductor switching element is turned on when the total current gain $\alpha_t = \alpha_1 + \alpha_2$ exceeds unity, where $\alpha_1$ and $\alpha_2$ are the current gain of the pnp-transistor portion and the npn-transistor portion of the pnpn-type element. It is known that this total current gain $\alpha_t$ exceeds unity when the applied voltage exceeds the maximum blocking voltage or if the applied voltage is under the maximum blocking voltage when a gate current is allowed to flow from the gate electrode to the cathode.

However, with an applied voltage under the inherent maximum blocking voltage, an element may be turned on with no gate current if the temperature of the element becomes high or the increasing rate of the applied voltage $dV/dt$ is large. This phenomenon is due to the fact that when the temperature of an element becomes high, the cross section of recombination centers for trapping carriers changes to lengthen the lifetime of carriers and the number of carriers in intermediate layers increases by thermal excitation to increase the leakage current of the junctions, thereby raising the total current gain $\alpha_t$ of the two transistor portions above unity. On the other hand when the increasing rate $dV/dt$ of the applied voltage V becomes large, the depletion layer of the central pn-junction expands rapidly and hence the number of carriers in intermediate layers increases due to the displacement current allowed to flow by the excluded carriers so as to increase the leakage current of the carriers, thereby increasing the total current gain above unity. Thus, such a semiconductor switching element is accompanied with the problems that expected operation characteristics cannot be obtained for such use when the load current is so large as to increase the temperature of the semiconductor substrate and when the rising rate of the applied voltage $dV/dt$ is large.

For eliminating the above effects at turning-on of an element, conventionally a shorted emitter structure has been generally employed in which the exposed surface of an intermediate layer and the surface of an adjacent outer layer is short-circuited with a cathode electrode to depress the injection of carriers from the outer to the intermediate layer, as is disclosed in U.S. Pat. No. 3,476,993. For example, if a pn-junction between an n-type emitter layer and an adjacent p-type base layer is short-circuited by a cathode electrode, the transistor portion comprising the n-type emitter layer, p-type base layer and n-type base layer hardly works as a transistor and the current gain approaches zero, whereby the total current gain of the two transistor portions may be depressed under unity. Thus, the above drawbacks can be eliminated by the shorted emitter structure.

However, upon turning on such a shorted emitter switching element by either raising the applied voltage or by allowing a gate current to flow, spreading of conducting portion is obstructed to decrease the maximum tolerable rising rate of current $di/dt$. Spreading of conducting portion is due to the following structure. First, the depletion layer of the central pn-junction is charged by carriers around the junction between the n-type emitter layer and the p-type base layer due to the gradient of carrier concentration between the initially conducting and blocking region and due to turning-on of the element. This charging action forms a depletion layer at the pn-junction between the n-type emitter and p-type base layer, which causes a potential drop between the conducting and blocking region generated in the p-type base layer to transfer the carriers in the conducting region to the blocking region. Whereas, according to the shorted emitter structure, some portion of the p-type base layer is directly contacted to the cathode electrode. In such contacted portions, no depletion layer is formed, decreasing the lateral potential difference in the base layer. Thus, the spreading speed of the conducting region decreases. For making the shorted emitter structure more effective, a multiplicity of through holes should be provided in the n-type emitter layer to directly connect portions of the p-type base layer to the cathode electrode. In these portions, no injection of electrons occurs since there is no emitter layer in these portions. Thus, the conducting portion must spread around the through holes. Thereby with a multiplicity of through holes, current should concentrate into the portion of the n-type emitter layer in the neighborhood of the gate electrode, causing a possibility of thermal breakdown. As is stated above, the shorted emitter structure has a drawback that a better effect is accompanied with a smaller maximum value of the current increasing rate.

An object of this invention is to provide a semiconductor device having a novel junction structure.

Another object of this invention is to provide a semiconductor device having a novel turning-on characteristic.

Further object of this invention is to provide a semiconductor device which is not affected by a temperature rise and the increasing rate of an applied voltage upon turning on and which has a superior maximum tolerable rate of current increase.

Another object of this invention is to provide a method for making such semiconductor devices.

The present invention will be described in detail hereinafter with reference to the accompanying drawing in which.

Figure 8A:
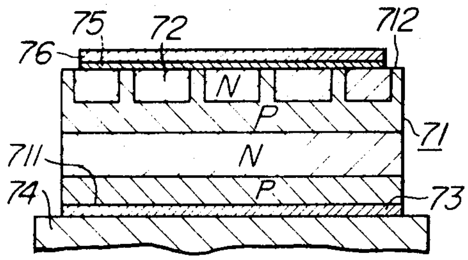
Figure 8B:
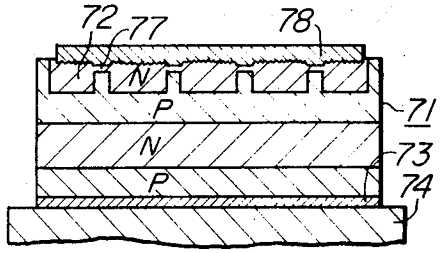

FIGS. 8*a* and 8*b* are vertical cross sections of a semiconductor device for illustrating the manufacture of a semiconductor device according to the invention, and FIGS. 9*a* to 9*g* are current-voltage characteristic curves between a gate and a cathode electrode for illustrating the most appropriate alloying temperature in case of forming a region of low injection efficiency in a semiconductor by alloying diffusion according to the invention.

Figure 1:
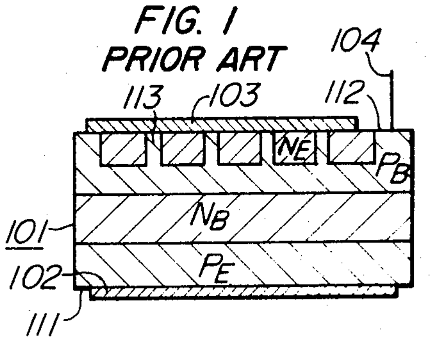
FIG. 1 PRIOR ART
FIG. 1 is a vertical cross-section of a conventional four-layer type semiconductor device.

In FIG. 1, a conventional four-layer type semiconductor device comprises a semiconductor substrate 101 including an n-type emitter region $N_E$, a p-type base region $P_B$, an n-type base region $N_B$ and a p-type emitter region $P_E$ between principal surfaces 111 and 112. The p-type base region $P_B$ is partially exposed on the principal surface 112 through the n-type emitter region $N_E$ at through holes 113. A cathode electrode is ohmically contacted to the n-type emitter region $N_E$ and the p-type base region $P_B$ on the principal surface 112 with low resistance. On the other principal surface 111, an anode electrode is contacted to the p-type emitter region $P_E$ with low resistance. Further, a gate electrode 104 is contacted to the p-type base region $P_B$. Provision of a multiplicity of through holes 113 makes the effect of a shorted emitter more apparent, but obstructs the spreading of a conducting portion, as is described above.

Whereas, according to the invention, there is provided a semiconductor device of pnpn- or npnpn-type comprising an n-type emitter layer composed of two regions, one region of which has a smaller emitter (or injection) efficiency than the other to decrease the injection of electrons from the n-type emitter layer into the p-type base layer in the blocking state for eliminating the effects due to temperature variation and the rate of rise of applied voltage $dV/dt$ upon turning on, and to inject electrons from the second region of the emitter layer to the p-type base layer upon turning on for facilitating the spreading of the conducting portion, and a method for making such a semiconductor device.

Figure 2:
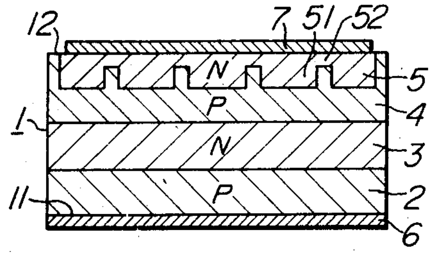
FIG. 2 is a vertical cross-section of a four-layer two-terminal type semiconductor device according to the invention.

FIG. 2 shows a four-layer two-terminal semiconductor device comprising a semiconductor substrate 1 having two principal surfaces 11 and 12. Between these principal surfaces, there are formed a p-type emitter, n-type base, p-type base, and n-type emitter layer 2, 3, 4 and 5 with a pn-junction between each pair of adjacent layers. The n-type emitter layer comprises a first region 51 having a greater thickness for increasing the injection efficiency, and a second region 52 having a smaller thickness for decreasing the injection efficiency. As shown in FIG. 2, the first region 51 is so formed that its area is larger than the area of the second region 52 and occupies the greater portion of the n-type emitter layer 5. To the principal surfaces, first and second electrodes are ohmically contacted with low resistance, respectively, as is shown in the figure.

When a potential is applied between the first and the second electrodes 6 and 7 with the first electrode 6 kept positive relative to the second electrode 7, the pn-junction between the p-type emitter layer 2 and the n-type base layer 3 and that between the n-type emitter layer 5 and the p-type base layer 4 are forwardly biased, but the central pn-junction between the p-type base layer 4 and the n-type base layer 3 is reversely biased to present a blocking state of the element. This blocking state is stable under no influence of a temperature rise and the rate of rise $dV/dt$ of an applied voltage until the applied voltage reaches the maximum blocking voltage of the element, since the n-type emitter layer 5 includes the second region 52 of low injection efficiency. That is, the second region 52 of the n-Type emitter layer 5 forms a pn-junction with the p-type base layer 4, but is thinner to allow a greater leakage current. Thus, the second region 52 is a region of low injection efficiency. Therefore, even when a temperature rise and the rate of rise of applied voltage $dV/dt$ become large to increase carriers in the p-type base layer, carriers are derived from the second electrode 7 through the leakage path of the second region 52 so that no storage of carriers is provided. Further, when carriers are derived from the second electrode 7, they take paths through the nearest portions of the second region 52, and thus the rate of flow in the lateral direction is kept small. Accordingly, the pn-junction between the n-emitter layer 5 and the p-type base layer 4 is hardly biased forwardly and is not turned on until the applied voltage exceeds the maximum blocking voltage.

When the applied voltage exceeds the maximum blocking voltage, the element is turned on from the blocking state to the conducting state, but this turning-on is not done all at once. First, a portion or portions of the n-type emitter layer 5 is turned on and then the conducting portion gradually spreads to the whole surface of the emitter layer 5. Although the second region 52 has a smaller thickness and thus supplies less injection of carriers than that of the first region 51 for providing the effect of shorted emitter structure, the spreading of the conducting portion is prevented in no way and done rapidly. Thus the effect of the shorted emitter structure can be provided without decreasing the maximum tolerable rising rate of current $di/dt$ according to the invention.

Figure 3:
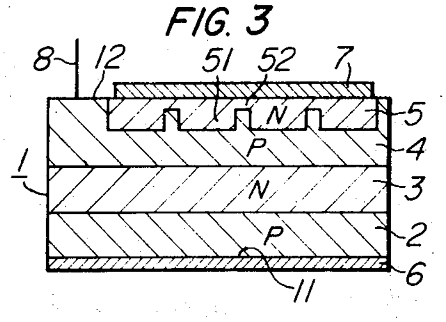
FIG. 3 is a vertical cross-section of a four-layer three-terminal type semiconductor device according to the invention.

FIG. 3 shows an embodiment of a four-layer three-terminal semiconductor device in which a gate electrode 8 is provided to the p-type base layer 4 of a semiconductor device as shown in FIG. 2. This device operates in the same manner as that of FIG. 2 if no gate current is allowed to flow from the gate electrode 8 to the second electrode 7. However, with a voltage applied between the first and second electrodes 6 and 7 (the electrode 6 kept positive relative to the electrode 7), this device can be turned on irrespective of the magnitude of the applied voltage if a current is allowed to flow between the gate and the second electrodes 8 and 7. Further, the conventional drawbacks mentioned above are eliminated in this embodiment since an n-type emitter layer 5 is also formed of a first region 51 of high injection efficiency and a second region 52 of low injection efficiency.

Figure 4:
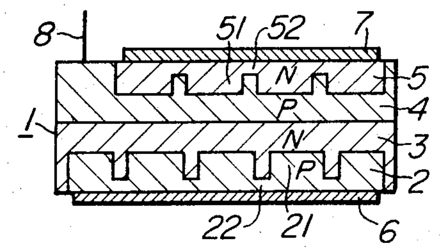
FIG. 4 is a vertical cross-section of another embodiment of four-layer three-terminal type semiconductor device according to the invention.

FIG. 4 shows an embodiment of four-layer three-terminal semiconductor which is provided with a gate electrode 8 on a p-type base layer 4 similar to that of FIG. 3 and further a p-type emitter layer 2 which is also divided into a first region 21 having a larger thickness and a higher injection efficiency, and a second region 22 having a smaller thickness and a lower injection efficiency. As shown in FIG. 4, the first region 21 is so formed that its area is larger than the area of the second region 22 and occupies the greater portion of the p-type emitter layer 2. Since both emitter layers comprise a region of high injection efficiency and another region of low injection efficiency, this embodiment is more effective than that of FIG. 3. That is, in an n-type base layer 3, there is a possibility, though smaller than that in the p-type base layer 4, that the device may be turned on before the flow of a gate current when an applied voltage has a large rising rate $dV/dt$ and causes a rapid temperature rise to cause storage of carriers which induces an injection of carriers from the p-type emitter 2 to the n-type base layer 3. Thus the effects of temperature rise and the rate of rise of applied voltage $dV/dt$ can be more stably eliminated by forming the p-type emitter layer with a first region 21 of high injection efficiency and a second region 22 of low injection efficiency.

Figure 5:
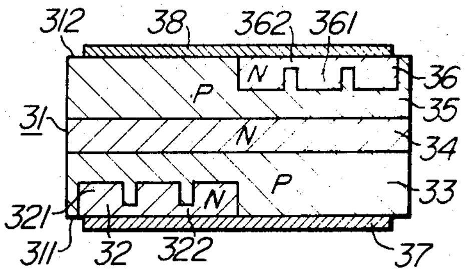
FIG. 5 is a vertical cross-section of a five-layer two-terminal type semiconductor device according to the invention.

In FIG. 5, a five-layer two-terminal semiconductor device is shown in which two four-layer two-terminal semiconductor devices such as that of FIG. 2 are formed unitary in parallel but in reverse orientation. The device comprises a semiconductor substrate 31 having two principal surfaces 311 and 312 and including between the principal surfaces 311 and 312 an n-type emitter layer 32, a p-type emitter and base layer 33, an n-type base layer 34, a p-type emitter and base layer 35 and an n-type emitter layer 36. The two emitter layers 32 and 36 are formed not to overlap or to overlap only in an extremely limited region when projected in vertical direction in the figure. Thus, on each principal surface, the adjacent p-type layer is exposed except the portion occupied by the n-type emitter layer. The exposed portion of said p-type layer works as an emitter and the portion hidden under the n-type emitter layer works as a base. Further, the n-type emitter regions 32 and 36 respectively composed of a first region 321 and 361 having a larger thickness and higher injection efficiency and a second region 322 and 362 having a smaller thickness and a lower injection efficiency. As shown in FIG. 5, the first regions 321 and 361 are so formed that their areas are larger than those of the second regions 322 and 362 and occupy the greater portions of the p-type emitter layer 32 and the n-type emitter layer 36, respectively. On the both principal surfaces, there is provided each one electrode 37, 38 which contacts the n-type emitter layer and the adjacent p-type layer. Such a double-structure affords turning-on operation in both directions. It will be apparent that the above-mentioned drawbacks of the prior art device is eliminated in this embodiment similar to the foregoing embodiments.

Figure 6:
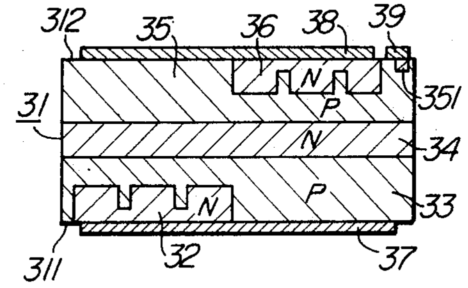
FIG. 6 is a vertical cross-section of a five-layer three-terminal type semiconductor device according to the invention.

FIG. 6 shows an embodiment of a five-layer three-terminal semiconductor device in which an n-type region 351 of small dimensions is formed in one p-type layer 35 adjacent to the principal surface in a semiconductor substrate similar to that of FIG. 5 and a gate electrode 39 is formed to contact both the n-type layer 351 and the p-type layer 35 to control the element by the gate current. This embodiment is the same as that of FIG. 5 in other respects.

Figure 7:
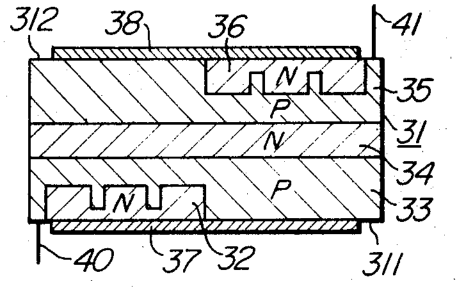
FIG. 7 is a vertical cross-section of a five-layer four-terminal type semiconductor device according to the invention.

FIG. 7 shows an embodiment of five-layer four-terminal semiconductor device in which two gate electrodes 40 and 41 are formed on the two p-type layers 33 and 35 of a semiconductor substrate as shown in FIG. 5 to control the turning-on operation in both directions.

Since the emitter structure of the embodiments of FIGS. 6 and 7 is same as that of the foregoing embodiments, the conventional drawbacks in turning-on operation are similarly eliminated in these embodiments.

As is stated above, in pnpn- or npnpn-type semiconductor devices, the variation in turn-on voltage due to a temperature rise and the rate of rise of applied voltage $dV/dt$, and the decrease of the maximum tolerable rate of current increase $di/dt$ due to the shorted emitter structure can be eliminated by composing at least one n-type emitter layer of a region of high injection efficiency and another region of low injection efficiency. Further a region of high injection efficiency can be formed by making the region thick in the direction of current flow and a region of low injection efficiency can be formed by making the region thin in the direction of current flow. This is based on the following reason. A region of high injection efficiency in this invention means a region which has little lattice defects and hardly allows a leakage current to flow, and thus easy to be forwardly biased. On the other hand, a region of low injection efficiency means a region which has many lattice defects and easily allows a leakage current to flow, and thus is not substantially affected by a forward bias. A region of large or small thickness allows a small or large leakage current. Thus, there is a relation between the thickness of a region and the injection efficiency of the region. Further, a region of high or low injection efficiency of this invention can be also formed in the following way:

1. A region of high injection efficiency may be formed by diffusion or epitaxial growth which forms only little lattice defects, and a region of low injection efficiency may be formed by alloying which often causes many lattice defects;

2. Before forming an n-type emitter layer by diffusion or alloying, portions of a semiconductor substrate where a region of low injection efficiency is to be formed may be sand-blasted to form minute unevenness.

Among these methods, the most appropriate one is to form a region of high injection efficiency by diffusion and a region of low injection efficiency by alloying. To form both regions by diffusion, the manufacture is rather difficult and further the effect of shorted emitter structure decreases to some extent since lattice defects are hardly formed according to this method. In case of forming both regions by alloying, the maximum tolerable rate of current increase $di/dt$ decreases since lattice defects are easily formed in the alloyed layer. Whereas the combination of diffusion and alloying solves such problems.

Now an embodiment of forming an n-type emitter layer by diffusion and alloying will be described hereinafter.

First, a first region of high injection efficiency of an n-type emitter layer is formed by selective diffusion using an oxide film as a mask. Then, a thin metal film mainly composed of gold is formed contiguous to the semiconductor surface by plating, vapor deposition or sputtering, where an n-type emitter layer is to be formed. On this metal film, a metal plate mainly composed of gold and including a donor impurity is placed. Such a structure is heated to alloy the metal plate onto the semiconductor surface where the n-type emitter region is to be formed and to form a second region of low injection efficiency in such a portion where said selective diffusion is not carried out. According to such a method, since the thin metal film is brought into hermetic contact with the semiconductor surface at every position, eutectic melting of the metal film and the semiconductor occurs at the same time at all the positions and the depth of the pn-junction surface formed between the second region formed by diffusion and the adjacent layer can be made wholly uniform. If the metal film is dispensed with, the contacting area of the metal plate and the semiconductor surface becomes smaller due to the unevenness of their surfaces, and eutectic melting begins at the contacting portion. Thus, the depth of the formed pn-junction surface becomes uneven. This unevenness causes no problem as long as the formed pn-junction surface is not deeper than that initially formed by selective diffusion. However, when the uneven pn-junction is deeper than the pn-junction formed by selective diffusion or when no pn-junction is formed by alloying, decrease in breakdown voltage of the device and/or delay in spreading of current upon turning on and hence decrease in the capacity for the rate of current increase *di/dt* occurs.

Further, since an electrode is formed of a metal layer and a metal plate, the electrode is thick so that in such devices where a lead-out wire is soldered to the electrode the resistance of the electrode in the lateral direction can be kept small to minimize the forward potential drop of the device. Further, since a thick electrode is formed of a thin metal film made by plating, vapor deposition or sputtering and a metal plate mounted thereon, time consumption needed for the manufacture can be made extremely smaller than that of the case where an electrode is wholly made by plating, vapor deposition or sputtering.

Moreover, since the outer portion of the electrode is made of metal including a donor impurity such as one mainly composed of gold and including antimony, in such devices where the electrode and a cooling body are compression-bonded there occurs no sticking between the electrode and the cooling body.

FIGS. 8*a* and 8*b* illustrate the above method. First, an acceptor impurity such as gallium or boron is diffused into are n-type semiconductor substrate 71 from the two principal surfaces 711 and 712 to form a pnp-trilayer structure. Then a donor impurity such as phosphorous is selectively diffused into the substrate 71 from one principal surface 711 by conventional method using an oxide film as a mask to form an n-type layer 72 as shown in FIG. 8*a*. Then, a support plate 74 made of molybdenum or tungsten is placed on the other principal surface 712 through an aluminum electrode plate 73. Such a structure is heated to 700° C. to fix the semiconductor substrate 71 and the support plate 74 to each other.

Next, on such portions of said one principal surface 711 where an n-type emitter layer is to be formed, a thin gold film 75 of a thickness about 1 $\mu$ is formed by plating, vapor deposition or sputtering and a gold plate 76 containing antimony and having a thickness of about 80 to 100 $\mu$ is placed thereon as is shown in FIG. 8*a*.

Then, such a structure is heated to the eutectic temperature of the semiconductor and gold to alloy the gold-antimony plate 76 to the substrate 71 through the thin film 75. Upon this heating, an n-type layer 77 is formed by alloying in the region except that of the n-type layer 72 formerly made by selective diffusion. The formerly made n-type layer 72 becomes a region of high injection efficiency and the n-type layer 77 made afterwards becomes a region of low injection efficiency, the two regions forming an n-type emitter layer. Reference numeral 78 indicates the electrode made of an alloy of the thin film layer 75 and the gold-antimony plate 76. In the case of silicon substrate, the heating temperature of the substrate, thin gold film layer and gold-antimony plate is preferably above 340° C. When a gold-antimony plate and a silicon body are to be alloyed to each other, it has been taught that the heating temperature should be above 370° C. since the alloying (or eutectic) temperature of a gold-antimony plate and a silicon body is 377° C. However, according to the above method, it has been found that gold and silicon form an alloy at 340° C.

Figure 9A:
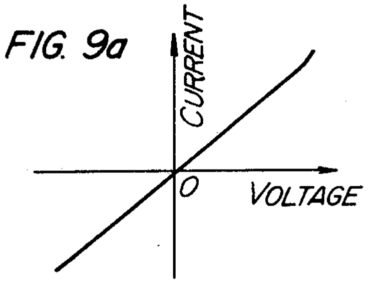
Figure 9B:
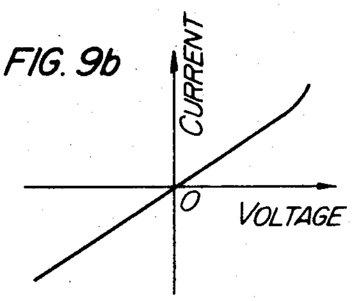
Figure 9C:
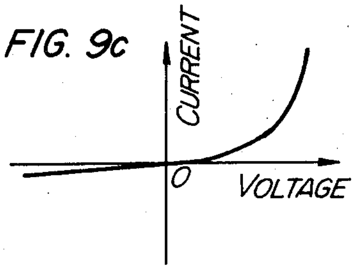
Figure 9D:
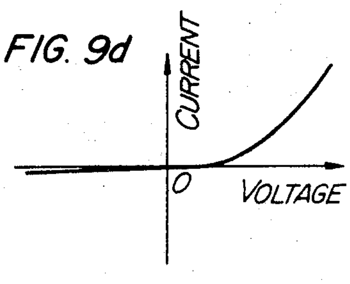
Figure 9E:
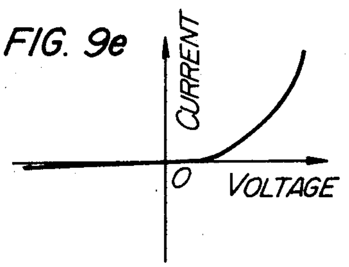
Figure 9F:
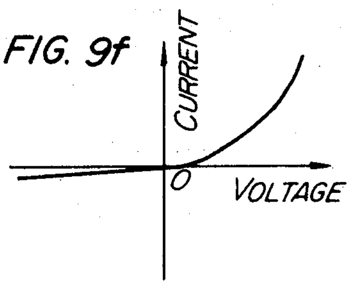
Figure 9G:
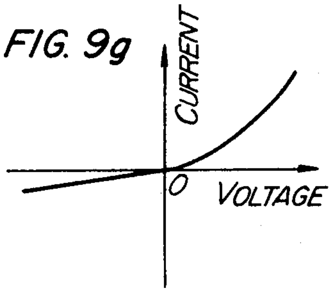

Various thyristors are formed by the above method illustrated in FIGS. 8*a* and 8*b* varying the heating temperature. FIGS. 9*a* to 9*g* show the current-voltage characteristic curves of such thyristors detected between the gate electrode and the cathode electrode. FIG. 9*a* shows the case of no heating, FIG. 9*b* heating at 330° C., FIG. 9*c* at 340° C., FIG. 9*d* at 350° C., FIG. 9*e* at 360° C., FIG. 9*f* at 370° C. and FIG. 9*g* at 380° C. As is apparent from these figures, at a heating temperature not above 930° C., the current-voltage characteristic curve is linear. That is, no pn-junction is formed or alloying is not carried out. Whereas, at a temperature of 340° C. or above, current does not or hardly flow when the gate electrode is applied with a negative potential and rapidly increases when the applied voltage becomes positive. That is, a pn-junction is formed or alloying is carried out. Further raising of the heating temperature causes only little variation. Therefore, the alloying temperature is preferably selected to be 340° C. to 370° C. in the above case.

What is claimed is:

1. A semiconductor device comprising:

a semiconductor substrate including a first region having one conductivity type, a second and a third region disposed on both sides of said first region and having the other conductivity type, a fourth region formed on said second region and having said one conductivity type, and a fifth region formed on said second region adjacent to said fourth region and having a lower injection efficiency and smaller area than those of said fourth region and said one conductivity type;

a first electrode ohmically contacted to said third region with a low resistance; and
a second electrode ohmically contacted with low resistance to said fourth and fifth regions.

2. A semiconductor device according to claim 1, further comprising a third electrode contacted to said second region.

3. A semiconductor device according to claim 2, wherein said fourth region has a greater thickness in the direction of current flow than said fifth region.

4. A semiconductor device according to claim 2, wherein said fourth region is a diffused region and said fifth region is an alloyed region.

5. A semiconductor device according to claim 2, wherein said third region further includes a portion of high injection efficiency and a portion of low injection efficiency.

6. A semiconductor device comprising:
a semiconductor substrate including a first region having one conductivity type, a second and a third region disposed on both sides of said first region and having the other conductivity type, a fourth region formed on said second region and having said one conductivity type, a fifth region formed on said second region adjacent to said fourth region and having a lower injection efficiency and a smaller area than those of said fourth region and said one conductivity type, a sixth region formed on said third region and having said one conductivity type, and a seventh region formed on said third region adjacent to said sixth region and having a lower injection efficiency and a smaller area than those of said sixth region and said one conductivity type,
a first electrode ohmically contacted to said second, fourth and fifth regions with a low resistance;
a second electrode ohmically contacted to said third, sixth and seventh regions with a low resistance.

7. A semiconductor device according to claim 6, further comprising a third electrode contacted to said second region.

8. A semiconductor device according to claim 7, further including an eighth region of said one conductivity type disposed in said second region and contacting said third electrode while being spaced apart from said fourth and fifth regions.

9. A semiconductor device according to claim 7, wherein said fourth and sixth region have a larger thickness in the direction of current flow than said fifth and seventh region, respectively.

10. A semiconductor device according to claim 7, wherein said fourth and sixth region are diffused regions and said fifth and seventh region are alloyed regions.

11. A semiconductor device according to claim 7, further comprising a fourth electrode contacted to said third region.

12. A semiconductor device according to claim 11, wherein said fourth and sixth region have a larger thickness in the direction of current flow than said fifth and seventh region, respectively.

13. A semiconductor device according to claim 11, wherein said fourth and sixth region are diffused regions and said fifth and seventh region are alloyed regions.

* * * * *